1,536,591

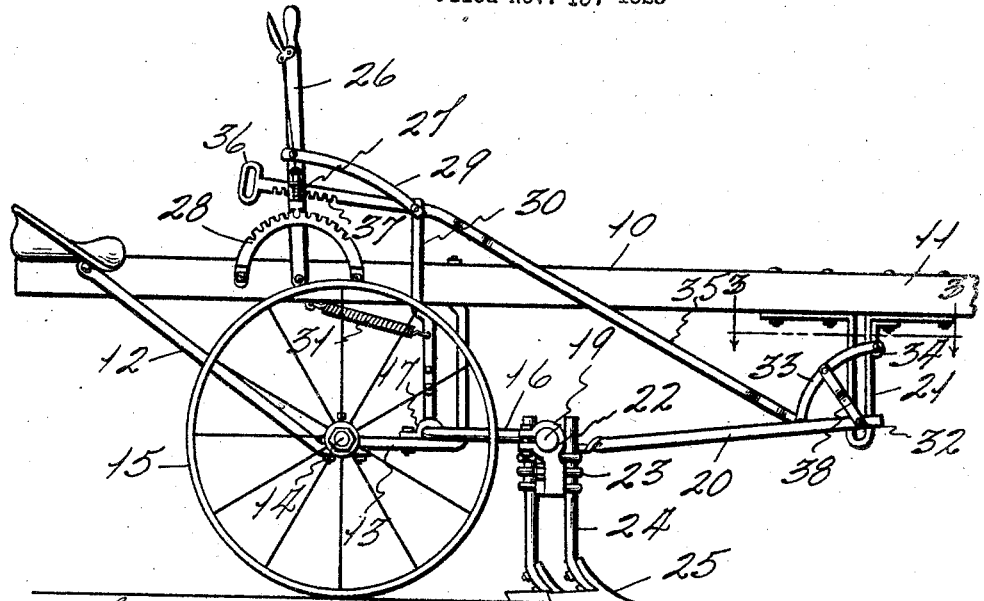
May 5, 1925.
T. M. KIRKPATRICK ET AL
AGRICULTURAL IMPLEMENT
Filed Nov. 13, 1923
1,536,591
Inventors
TIMOTHY M. KIRKPATRICK
WILLIAM A. CLAUNCH
By Jack A. Schley
Attorney Patented May 5, 1925.

UNITED STATES PATENT OFFICE.

TIMOTHY M. KIRKPATRICK AND WILLIAM A. CLAUNCH, OF MAYPEARL, TEXAS.

AGRICULTURAL IMPLEMENT.

Application filed November 13, 1923. Serial No. 674,433.

*To all whom it may concern:*

Be it known that we, TIMOTHY M. KIRKPATRICK and WILLIAM A. CLAUNCH, citizens of the United States of America, residing at Maypearl, in the county of Ellis and State of Texas, have invented certain new and useful Improvements in Agricultural Implements, of which the following is a specification.

This invention relates to new and useful improvements in agricultural implements.

The object of the invention is to provide an implement which when plowing transversely of the rows will leave gaps and cut out the plants or vegetation in said gaps, whereby the plants between said gaps will be blocked off.

An object of the invention is to provide certain improvements on the implement set forth in our co-pending application Serial No. 648,968.

It frequently occurs that the cotton rows are comparatively flat or they may be "bedded up" and therefore a practical implement must be adjustable to care for these conditions and one of the objects of the invention is to provide such adjustment.

A particular object is to provide means combined with the vertical adjusting means for adjusting the shovel points for deep and shallow cuts.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a side elevation of an implement constructed in accordance with our invention;

Fig. 2 is a plan view of the same, and

Fig. 3 is a sectional view on the line 3—3 of Fig. 1.

In the drawings the numeral 10 designates a central beam, the forward end of which is extended to form a tongue 11. The rear end of the beam is supported on the upper ends of rearwardly inclined standards 12 having their lower ends joined to angular brackets 13′ which are mounted on an axle 14. The axle is suitably supported in ground wheels 15. The brackets 13 have their forward portions arched and secured to the underside of the beam.

A yoke 16, horizontally disposed, is mounted in bearing boxes 17 on the brackets and has hooks 18 on the forward ends of its legs engaging around a transverse plow beam 19. The beam is fastened to the rear ends of a V-shaped supporting member 20, which straddles at its forward end a U-shaped hanger 21 depending from the tongue 11.

Collars 22 of suitable construction, such as are ordinarily used on cultivator beams, are fastened on the beam 19 in spaced order. Each collar has an eye bolt 23 which receives the vertical shank 24 of a sweep 25. The collars are alternately directed forwardly and rearwardly, whereby the sweeps on the front side of the beam 19 have their points in advance of the points of the sweeps attached to the rear side of the beam.

An adjusting lever 26 is pivoted to one of the beams and has a locking plunger 27 engaging a segment 28. The lever is pivoted to one end of a link 29 which has its forward end pivoted to the upper end of an arm 30 extending upwardly from the rear transverse bar of the yoke 16, with which it is rigid. It will be seen that when the lever is swung the arm will also be swung and the yoke rocked, whereby the beam 19 will be raised or lowered, thus vertically adjusting the shovels. The arm 30 is sustained by a coiled spring 31.

The member 20 has a cross bolt 32 extending through the hanger 21. A lever 33 has its upper end pivoted in a bracket 34 carried by the hanger. A pitman 35 is pivoted to the lower end of the lever 33 and is slotted longitudinally to straddle the beam 10. The rear end of the pitman has a handle 36 and is provided with spaced notches 37 in its under edge for engaging a stud on the side of the lever 26, whereby the pitman is held against longitudinal displacement. The lever 33 is pivoted at its center to the upper end of an inclined link 38 which has its lower end pivoted on the bolt 32.

It will be seen that the beam 19 is rigidly fastened to the rear ends of the V-shaped member 20 and said beam is rotatable in the hooks 18. When the pitman 35 is lifted and pulled rearwardly the lever 33 is swung upwardly thus carrying the link 38 upward and thereby elevating the front end of the member 20. This rocks the beam 19 and tilts the shovels 25 whereby their points are raised. Upon pushing the pitman forwardly the operation is reversed and the points of the shovels are lowered. During the adjustment the yoke 16 is held rigid by the lever 26, but if the lever 26 is swung to vertically adjust the beam 19 and the sweeps, the pitman is also swung. If the vertical adjustment is maintained, then the member 20 is adjusted in harmony therewith by moving the pitman, but if the sweeps are returned to their original position, then the pitman will return the member 20 to its original position.

Various changes in the size and shape of the different parts as well as modifications and alterations may be made within the scope of the appended claim.

What we claim is:

In an agricultural implement, a longitudinal wheel supported beam, a yoke movable under the longitudinal beam, a transverse plow beam rotatable on the yoke, sweeps carried by the transverse beam, a vertical adjusting lever mounted on the longitudinal beam, a connection between the adjusting lever and the yoke normally holding the latter immovable, a member having its rear end rigid on the transverse beam, a guide hanger at the forward lever connected with the forward end of the member, and a pitman extending rearwardly from the forward lever and detachably engaging the adjusting lever.

In testimony whereof we affix our signatures.

TIMOTHY M. KIRKPATRICK.
WILLIAM A. CLAUNCH.